United States Patent

[11] 3,544,064

[72] Inventor Bernard Carlin
 Orange, Texas
[21] Appl. No. 841,039
[22] Filed July 11, 1969
[45] Patented Dec. 1, 1970
[73] Assignees Preston Cessac, Sr.
 Nederland, Texas
 a part interest;
 Delmon Shults, Jr.
 Orange, Texas, a part interest

[54] BLOW-OUT PROOF PACKING FOR AXIALLY MOVABLE ROD OR SHAFT
1 Claim, 12 Drawing Figs.

[52] U.S. Cl. ..................................... 251/214;
 277/171
[51] Int. Cl. ..................................... F16k 41/00
[50] Field of Search........................... 251/214,
 215; 277/144, 145, 154, 120, 168, 169, 170, 171

[56] References Cited
UNITED STATES PATENTS
2,744,775 5/1956 Bredtschneider ............ 251/214X
FOREIGN PATENTS
10,716 10/1899 Great Britain................ 251/214
638,164 5/1950 Great Britain................ 277/170

Primary Examiner—M. Cary Nelson
Assistant Examiner—David R. Matthews
Attorney—Alexander B. Blair ABSTRACT: While not limited to such use, the device is particularly intended as a packing for valve stems wherein the stem is altered to receive packing elements so constructed that endwise movement of the valve stem or the like causes the packing to grip tightly against both the stem and the cylinder in which it operates to provide positive blowout protection.

INVENTOR.
BERNARD CARLIN
BY
Alexander B. Blair
ATTORNEY.

Patented Dec. 1, 1970 3,544,064

INVENTOR.
BERNARD CARLIN
BY
Alexander B. Blair
ATTORNEY.

3,544,064

BLOW-OUT PROOF PACKING FOR AXIALLY MOVABLE ROD OR SHAFT

FIELD OF THE INVENTION

The device is particularly intended for use with valve stems which are axially movable, for example, the stems used for moving gate valves. Its function is to prevent any possibility that accumulated pressures below the packing elements will cause a blowout of the upper valve mechanism. The invention, however, is not limited to the field of valves but may be used with any mechanisms employing operating rods movable in a cylinder and subjected to pressures which it is desired to so control as to prevent any blowing out of the parts.

SUMMARY OF THE INVENTION

The invention is disclosed as being utilized in connection with a gate valve and the operating mechanism therefore including an operating stem having swivel connection with the valve element and having threaded connection with a head secured to the upper end of a valve bonnet whereby rotation of the valve stem effects axial movement thereof to open and close the valve. The valve stem is provided with at least one groove, and preferably two grooves, the surface of the bottom of which groove is formed as two intersecting truncated cones decreasing in diameter toward the center of the groove. Around each such groove is arranged a packing element formed of split sections having an outer cylindrical surface slidable in the bonnet of the valve and an inner surface of truncated conical form adapted to substantially fit the corresponding groove surfaces. The packing is adapted to partake of extremely limited movement longitudinally of the valve stem and when the latter is moved axially, friction of the packing in the cylinder tends to retard movement of the packing to cause the stem to move relative thereto so that the sloping engaging surfaces of the groove and packing tend to bind the elements so as to form extremely leak-proof joints.

Each packing element is formed of separable parts divided generally longitudinally of the stem but inclined in one circumferential direction from the top and bottom edges of the packing to the center thereof to allow for limited radial contraction of the packing to provide additional binding surfaces.

DESCRIPTION OF THE PREFERED EMBODIMENTS

Figure 1:
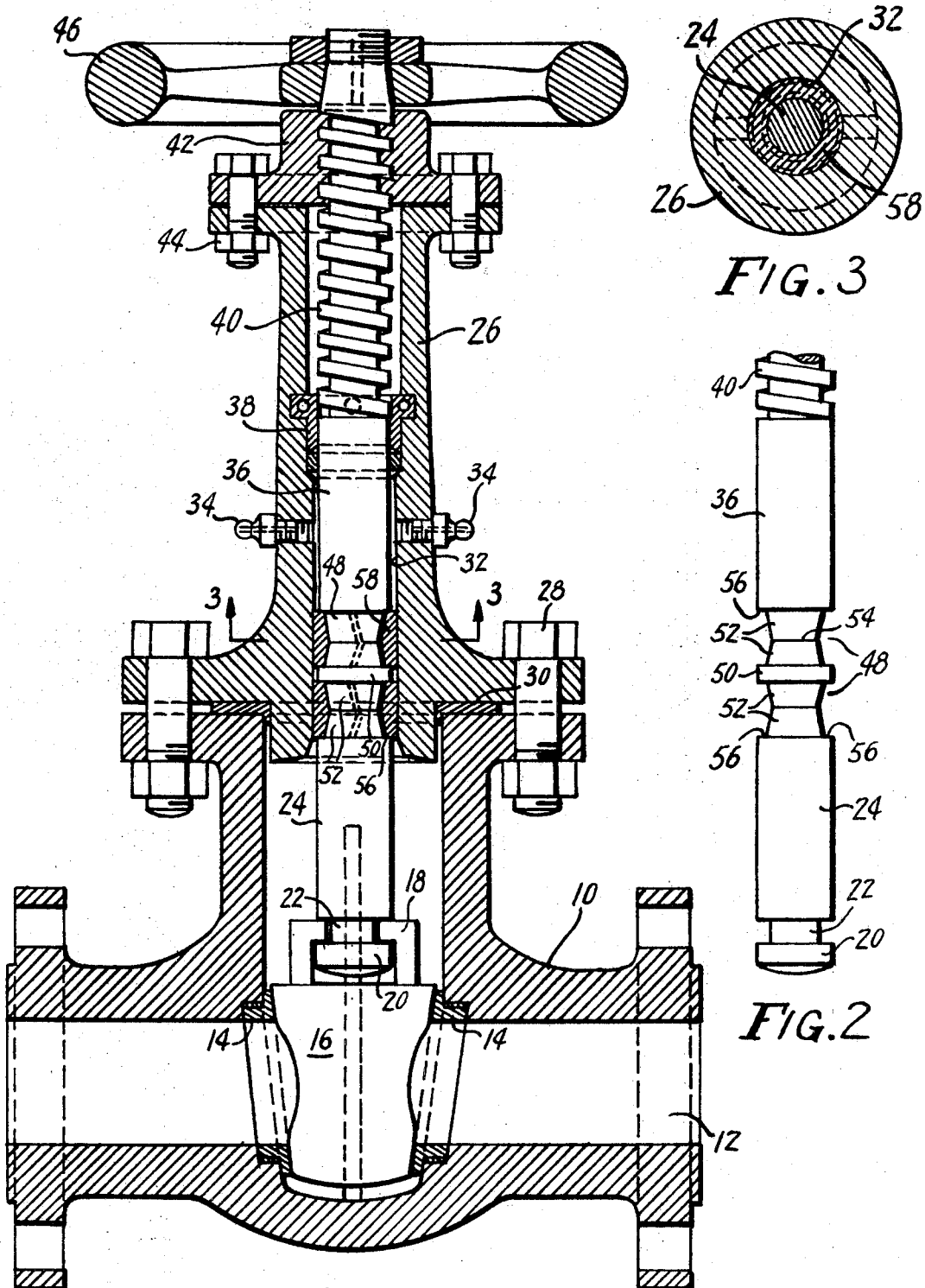
FIG. 1 is an axial sectional view through a valve mechanism showing the invention applied.
Figure 3:
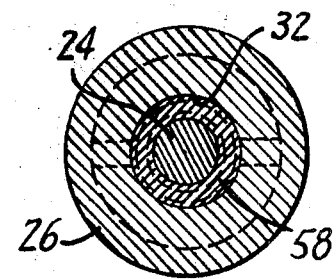
FIG 3 is a section on line 3–3 of FIG. 1.

Referring to FIG. 1, the numeral 10 designates a valve body having a run 12 therethrough provided with a conical valve seat 14 in which is arranged a gate valve 16. This valve is provided with an upwardly extending socket 18 receiving a swivel head 20 connected by a stem 22 to the main valve rod 24 further described below.

A bonnet 26 is arranged above the valve body 10 and is secured thereto by bolts 28, packing elements 30 being arranged between the flanges through which the bolts 28 extend. The bonnet is provided with a bore 32 coaxial with the valve 16. The bonnet 26 may be provided with grease fittings 34 of conventional type.

The bonnet 26 extends upwardly substantially above the valve body and the valve stem 24 is provided with a cylindrical portion 36 movable in a suitable packing gland 38. Above such gland, the valve stem is threaded at 40 to extend through an internally threaded cap 42 secured to the upper end of the body by bolts 44. The upper end of the valve stem is provided with an operating wheel 46, and it will be apparent that rotation of this wheel rotates the valve stem to effect upward and downward movement thereof to move the valve 16 upwardly and downwardly between closed and open positions.

Figure 2:
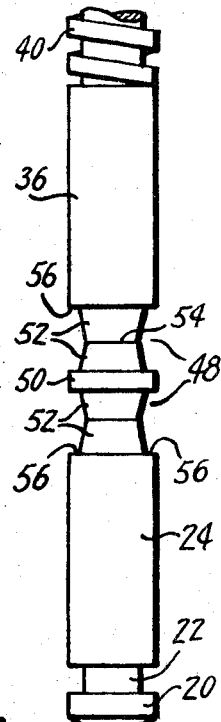
FIG. 2 is a side elevation of a portion of the valve stem.

The valve stem 24 is provided with at least one groove, and preferably two, as shown in FIGS. 1 and 2 and indicated by the numeral 48. Each of these grooves is adapted to receive a packing element of one of the types described below. The grooves 48 may be arranged in relatively close proximity and separated by an annular flange 50 as clearly shown in FIG. 2. Each groove is provided with an inner surface made up of frustoconical surfaces 52 converging toward each other to the point 54 intermediate the height of the associated groove. The major radial dimension of each groove is smaller than the diameter of the valve stem so that a shoulder 56 is provided at each end of each groove 48.

Each groove 48 is adapted to receive a packing unit indicated as a whole by the numeral 58 and illustrated in FIGS. 4, 5, 8 and 10. Each packing unit comprises complementary sections 60 having their adjacent edges very slightly spaced. Each packing is formed with its inner surface defining two frustoconical surfaces 62 corresponding to the shape of the surfaces 52 and contacting therewith. The upper and lower extremity of each packing unit engages the shoulders 56. The valve stem is slightly smaller than the bore 32 of the bonnet. The external surface of each packing unit 58 is cylindrical and has a sliding fit in the bore 32, each packing unit therefore extending radially a little beyond the surface of the valve stem as at 64.

Figure 4:
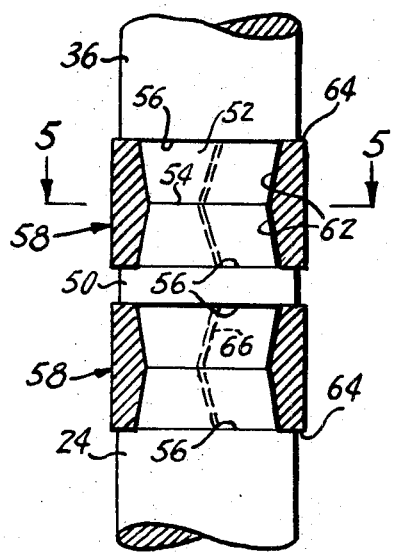
FIG. 4 is an enlarged fragmentary sectional view through two of the packing units, the associated portion of the valve stem being shown in elevation.
Figure 10:
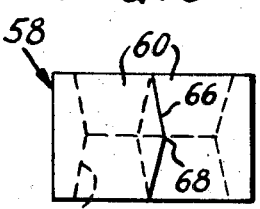
FIG. 10 is a side elevation of one of the packing units shown in FIG. 8.

The division between the segments of each packing unit is shaped as shown in FIGS 4 and 10, the adjacent edges of the complementary units being slightly spaced and sloped in the same direction circumferentially of the device from the top and bottom edges of each packing unit as at 66, these inclined surfaces meeting at the point 68 coincident with the transverse plane of the line 54. The elements of the packing unit may be formed of metal or vulcanized rubber, and in the embodiment described the unit is preferably formed of metal.

Figure 6:
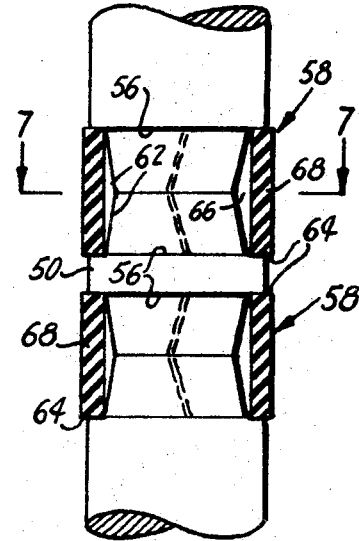
FIG. 6 is a view similar to FIG. 4 showing a modified form of packing units.
Figure 5:
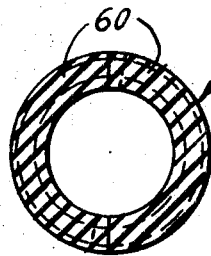
FIG. 5 is a section on line 5–5 of FIG. 4.
Figure 7:
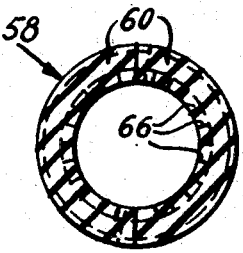
FIG. 7 is a section on line 7–7 of FIG. 6.
Figure 8:
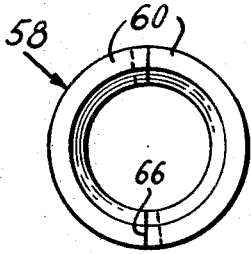
FIG. 8 is a plan view of the split ring forming one of the packing units as employed in FIG. 4.
Figure 9:
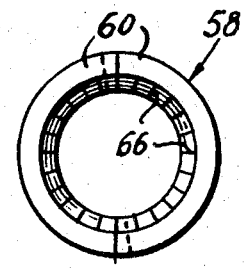
FIG. 9 is a similar view of one of the packing units employed in the modification shown in FIG. 6.

A somewhat modified form of packing unit is shown in FIGS 6, 7 and 9 wherein the unit is preferably formed of vulcanized rubber. The two such units shown in the FIGS. referred to are identical with those described except that the inner surface of each unit is slit vertically as at 66. Otherwise, each unit in FIGS 6, 7 and 9 has its parts indicated by the same reference characters as at FIG 4. Slits 66 have their inner limits terminating in lines 68 parallel to the cylindrical outer surfaces of the units. These slits have their upper and lower ends terminating coincident with the radially outer limits of the tops and bottoms of the the surfaces 52.

Figure 11:
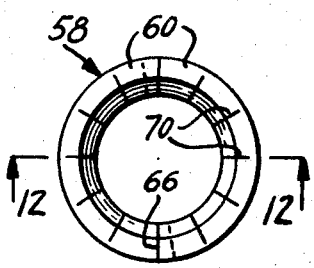
FIG. 11 is a plan view of a further modified form of packing unit.
Figure 12:
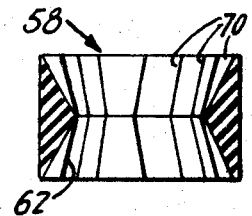
FIG. 12 is a section on line 12–12 of FIG. 11.

In FIGS. 11 and 12, a very similar packing unit 58 is employed which may be made of vulcanized rubber, but in this instance, the slits indicated at 70 are tapered upwardly and outwardly from the plane of the minimun diameter of each unit 58 to a point in proximity to the radially outer limits of the upper and lower edges of the units as shown in FIGS. 11 and 12.

OPERATION

The device is illustrated as being associated with a gate valve mechanism, but it will be apparent that it is applicable to valves of any type and to rods associated with any other types of mechanisms in which the rods are adapted to partake of axial movement. The operation of the valve itself in FIG. 1 is obvious, the wheel 46 being turned to be fed upwardly or downwardly by the threads 40 to transmit movement through the swivel connection of the rod with the valve element to raise it to open position or move it downwardly to closed position.

Assuming that the valve is to be opened, the wheel 46 will be turned, and the threaded connection moves the valve stem 24 upwardly. The friction of the packing units 58 with the cylindrical surface 32 tends to move the packing units relatively downwardly whereby the frustoconical surfaces 62 (FIG. 4) engaging the groove surfaces 52 tend to expand the packing units, thus causing a snug fit of the packing units against the cylindrical surface 32 and against the rod surface 52, thus forming an effective seal. The very slight play at the dividing lines 66 of the packing units permits minute radial contraction of the packing units to form the functions stated. It will be apparent, of course, that there is slight play between the top and bottom edges of the packing units and the shoulders 56 to permit the very slight relative axial movement referred to take place between the packing units and the valve operating rod.

The packing units in FIGS 4, 5, 8 and 10 are preferably formed of metal, whereas the packing units shown in FIGS 6, 7, 9, 11 and 12 may be formed of relatively hard vulcanized rubber possessing a slight degree of elasticity. The devices in the FIGS. last referred to function in exactly the same manner as the metallic packing units except that the slits 66 (FIGS. 6, 7 and 9) and 70 (FIGS. 11 and 12) facilitate a slight degree of deformation upon endwise movement of the valve operating rod 24 to permit a tight fitting movement of the part when the packing units partake of their slight relative movement axially of the rod 24.

The device thus provides an effective completely fluid-type packing unit for a rod which partakes of axial movement in a cylinder and provides positive protection against excessive pressure blowing past the valve stem or other reciprocating rod. The subjection of the device to excessive pressures therebelow, with the valve rod in any given position, acts against the projecting surface 64 of the lower packing unit and against the similar shoulder of the upper packing unit if any pressure should escape the lower unit, to effect slight relative upward movement of the packing units so that the upper surfaces within the packing units slide over the upper surfaces 52 of the rod to provide the tight binding packing operation described above. Thus the device is completely blowout proof.

From the foregoing it will now be seen that there is herein provided an improved blowout proof packing for an axially movable rod or shaft which accomplishes all of the objects of this invention and others, including many advantages of great practical utility and commercial importance.

As various embodiments may be made of this inventive concept, and as many modifications may be made in the embodiments hereinbefore shown and described, it is to be understood that all matter herein is to be interpreted merely as illustrative, and not in a limiting sense.

I claim:

1. A packing for a valve structure comprising a valve body, a valve element therein, a valve stem connected to said valve, a bonnet fixed to said valve body and provided with a bore through which said valve stem projects, and means for operating said valve stem to more it axially in said bore, said valve stem being provided with an annular groove, and a packing in said groove having a cylindrical outer surface slidable in said bore, said packing and said groove having cooperating surfaces inclined relative to the axis of said rod, said packing being mounted for slight axial movement relative to said rod, whereby, when said rod is axially moved in said bore, frictional engagement of the outer surface of said packing with said bore tends to cause relative axial movement between said packing and said rod whereby said cooperating surfaces will tend to expand said packing thus tightly engaging said cooperating surfaces with each other and tightly engaging the cylindrical outer surface of said packing with said bore, said groove being provided with frustoconical surfaces coaxial with said rod and decreasing in diameter from the ends of said groove to a point intermediate the length thereof, said packing having corresponding frustoconical inner surfaces engaging the frustoconical surfaces of said groove, said frustoconical surfaces of said packing and said rod constituting said cooperating surfaces.